United States Patent
Alexander et al.

[11] 3,778,021
[45] Dec. 11, 1973

[54] POWER SYSTEMS FOR VALVE SYSTEMS

[76] Inventors: Joe K. Alexander; Donald D. Williams, both of Box 92, Friendswood, Tex. 77546

[22] Filed: Feb. 19, 1971

[21] Appl. No.: 117,100

Related U.S. Application Data

[63] Continuation of Ser. No. 84,255, July 17, 1969, abandoned.

[52] U.S. Cl............... 251/11, 236/68 A, 60/25
[51] Int. Cl....... G05d 7/06, F03g 7/06, F16k 31/02
[58] Field of Search............... 251/11; 60/25; 236/68 A

[56] References Cited
UNITED STATES PATENTS

| | | | |
|---|---|---|---|
| 2,833,507 | 5/1958 | Dube et al. | 251/11 |
| 3,132,472 | 5/1964 | Schweitzer | 60/25 X |
| 1,983,314 | 12/1934 | Schultz | 60/25 |
| 2,086,819 | 7/1937 | Persons | 60/25 |
| 1,312,040 | 8/1919 | Mercier | 251/11 X |
| 2,833,507 | 5/1958 | Dube et al. | 251/11 |
| 3,132,472 | 5/1964 | Schweitzer | 60/25 X |

*Primary Examiner*—Arnold Rosenthal
*Attorney*—Pravel, Wilson and Matthews

[57] ABSTRACT

A closed, self-sustaining power system for the operation of valves includes a first means for storing and containing an expandable system which means communicates with a responsive means of a valve system to enable the valve system to be opened, closed or controlled. A controlled energy means transmits energy to the expandable medium to thereby cause an increase in pressure in the responsive means of the valve system which enables the valve system to respond as desired. After actuation of the responsive means of the valve system, the means for storing is enabled to communicate with a reservoir means which thereby increases the area of the closed system to reduce the pressure in the closed system sufficiently to terminate actuation of the responsive means of the valve system.

8 Claims, 1 Drawing Figure

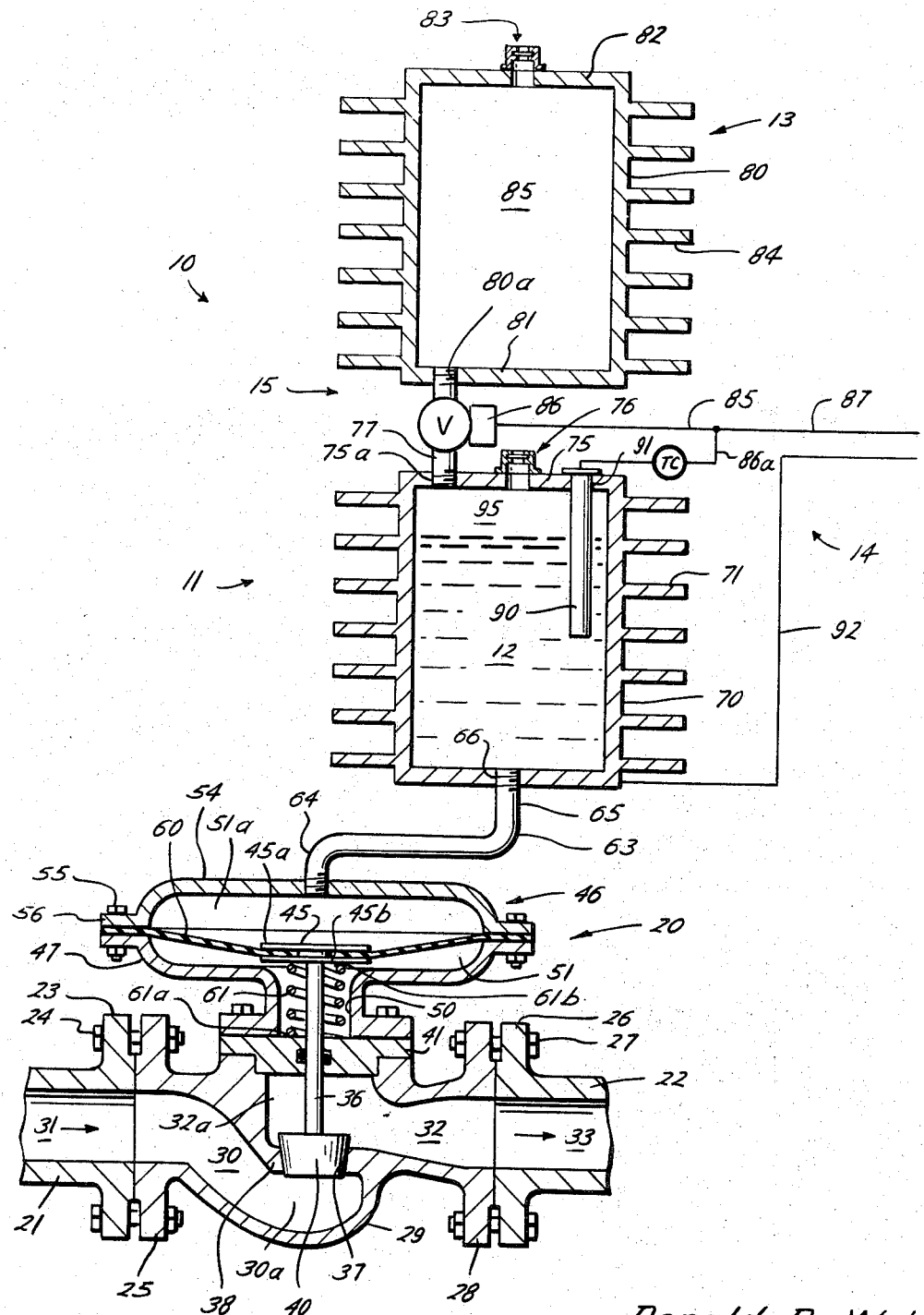

3,778,021

POWER SYSTEMS FOR VALVE SYSTEMS

CROSS REFERENCE TO RELATIVE APPLICATION

This application is a continuation of U. S. Pat. application Ser. No. 842,555, filed July 17, 1969, and now abandoned.

BACKGROUND OF THE INVENTION

1. Field of the Invention

This invention relates to an improved, closed power system for the operation of valves.

2. Description of the Prior Art

Heretofore, power systems for valves, mostly diaphragm or piston type, included expensive tubing or conduits for air pressure systems or motor driven or solenoid actuated valves.

Such valves were expensive relative to initial purchase price and also expensive to maintain. Further, the expense to such valves becomes very great when the control site for the valves was several thousand feet or even miles from the installation site of the valve system.

SUMMARY OF THE INVENTION

Briefly, the present invention includes an improved closed system for the operation of valve systems which comprises a means for storing an expandable medium wherein an increase in pressure in the means for storing causes an increase in pressure in the closed system, means for communicating said means for storing with said valve system, and a reservoir means connected with said means for storing, said reservoir means receiving the expandable medium when it is desired to decrease the pressure of the closed system and a controlled energy means for transmitting energy to said expandable medium to thereby cause an increase in pressure in the closed system.

BRIEF DESCRIPTION OF THE DRAWING

The FIGURE is a view, of the end section, of an embodiment of the closed power system for the operation of a valve system.

DESCRIPTION OF THE PREFERRED EMBODIMENT

Attention is directed to the FIGURE wherein the power system of the present invention is generally designated by the numeral 10 and is illustrated as including a means for storing, generally designated at 11 and, an expandable medium 12. The power system 10 also includes a reservoir receiving means generally designated at 13 and an energy means generally designated at 14. The power system 10 also includes a releasable blocking means, generally designated at 15, mounted between the reservoir receiving means 13 and the means for storing 11.

A valve system, generally designated at 20 is positioned between an upstream tubular member 21 and a downstream tubular member 22. The upstream tubular member includes a flange member 23 which is suitably secured by nut and bolt means 24 to a matching flange member 25 of the valve system 20. Downstream tubular member 22 includes a flange member 26 which is secured by a suitable nut and bolt means 27 to a matching flange member 28 of the valve system 20.

The valve system 20 includes a body 29 having an upstream channel 30 which communicates with a bore 31 in the upstream tubular member 21. The body 29 also has a downstream channel 32 positioned above the upstream channel 30 which bore 32 communicates with the downstream channel 33 of the downstream tubular member 22. A movable arm 36 extends downwardly into a portion 32a of the downstream channel 32 which portion 32a is positioned above a portion 30a of the upstream tubular channel 30. An opening 37 extends through a rib partition 38 of the valve body 29 to enable the upstream channel 30 to communicate with the downstream channel 32 when the opening 37 is not closed.

A plug member 40 is positioned on the lower end of the arm 36 for movement downwardly and upwardly relative to the opening 37 for closing and opening of the opening 37 as desired. Arm 36 extends upwardly through a cap member 41 for connection with a diaphragm responsive member 45.

As illustrated in the FIGURE, a housing, generally designated at 46 includes a lower member 47 which is secured by suitable nut and bolt means 48 to the cap member 47. The lower housing member 47 also includes an opening 50 which communicates with a hollow inner portion 51 of the housing 46. An upper housing member 54 is secured to the lower housing member 47 by a suitable nut and bolt means 55 mounted and secured with matched flange or tab members 56 of each of the upper and lower housing members 54 and 47, respectively. A suitable diaphragm member 60 is mounted between the flange members 56 and extends across the opening 51 of the housing member 46. The diaphragm member 60 is also mounted between two flange members 45a and 45b of the diaphragm retainer member 45.

A suitable spring means 61 is positioned concentrically relative to the arm 36 and rests at one end 61a on the upper surface of the cap member 41 of the valve body 29. The other end 61b of the spring extends upwardly and contacts the lower surface of the diaphragm tab member 45b.

The diaphragm retainer member 45 is sufficient in circumference since its radius is larger than the radius of the opening 50 to prevent the diaphragm retainer member from moving too far relative to the diaphragm 60 to prevent damage to such diaphragm.

A tubular member or conduit 63 is connected at one end 64 to the upper housing section 54 and at the other end 65 with an opening 66 in the means for storing 11. The embodiment illustrated as a means for storing includes a cylindrical chamber 70 having outwardly extending fins 71 along the cylindrical walls thereof for the dissipation of heat. The cylindrical chamber 70 includes an opening for containing the expandable medium 12. The expandable medium 12 may be, for example, a liquid such as Freon 113. However, it is to be especially understood that such expandable medium is not limited to Freon or any of the additives of Freon. The upper surface 75 with the cylindrical chamber 70 is provided with a safety valve, a blowout valve 76, which is closed during normal operations but which may be set to open when the pressure inside the cylinder 70 exceeds a desired maximum.

An opening 75a in the upper surface 75 of the cylinder 70 receives a tubular member or conduit 77 which is connected at its other end with an opening 80a with the reservoir receiving means 13. In this embodiment the reservoir receiving means is a cylindrical chamber 80. As illustrated in the FIGURE the opening 80a is through the lower surface 81 of the cylinder and an upper surface 82 receives a safety valve outlet generally designated at 83, similar to the safety valve outlet 76. A plurality of outwardly extending heat dissipation fins 84 extends outwardly from the cylindrical wall 80 similar to the fins 71 relative to the cylindrical wall 70. The cylindrical wall 80 and the upper and lower surface 81 and 82 form a chamber 85 for receiving excess vapor pressure, or in some instances fluid, when it is desired to decrease the pressure in the closed system, which operation will be explained hereinbelow.

A solenoid valve V is positioned in the conduit 77 to block or prevent communication of the means for storing 11 relative to the reservoir receiving means 13. A suitable electrical conduit 85 is connected to an electro-mechanical means 86 for opening and closing of the valve V. Another electrical conduit 86a is connected in series with the electrical conduit 85 which is also connected to a signal source 87, and includes a temperature control device (TC) which regulates the electrical current passing through the conduit 86a. The electrical conduit 86a is connected with a suitable heating device 90 such as a heating coil which is positioned in the chamber 71 and which extends downwardly into the expandable medium 12. The heating device is positioned in the chamber or opening 71 by being positioned through an opening 91 in the upper surface 75 of the cylinder 70. A suitable electrical conduit 92 is provided for negative or ground potential and is secured at one end to the cylinder 70 as illustrated in the FIGURE. It should also be noted that the electrical signals, while being illustrated as being transmitted through electrical conduits may be transmitted with other types of transmission devices and that with respect to the type of electrical impulse used that the initiation point for such electrical signal, if desired, may be several miles away.

The valve system 20 that has been disclosed, is of the air operated type in which air pressure, transmitted through tubular conduits, forces the diaphragm member 60 downwardly to overcome the spring means 61 if it is desired to close or partially close such valve system 20. Thus, as pressure increases in the upper section 51a of the opening 51 the diaphragm is forced downwardly to move the arm 36 downwardly to thereby cause the plug 40 to be received in the opening 37 to prevent communication between the downstream channel 30 and the upstream channel 32 to valve body 29.

The embodiment illustrated in the FIGURE has been disclosed as being used with an air operated valve system which, for example, operates in the range of from 0 to 15 pounds per square inch at temperatures between 117.6° to 160° F. If the expandable medium 12 is, for example, Freon 113, the heat transfer means 90, when electrically actuated, will raise the liquid 1° F. for each 2/10 Btu per pound. Thus, it should be readily apparent from the example that the chamber 70 may be very small which will allow or permit low electrical wattage usage.

In normal operations, the spring means 61 forces the plunger arm 36 and plug member 40 upwardly so that the upstream channel 30 communicates with the downstream channel 32. If it is desired to partially close to upstream channel 30 relative to the downstream channel 32 or completely close the upstream channel 30 relative to the downstream channel 32, an electrical signal is transmitted through the electrical conduit 87 which actuates the electro-mechanical means 86 to close the solenoid valve V which in this example is normally open. Such electrical signal also actuates the temperature control device which in turn electrically actuates the heating element inside the chamber 71. As heat is transmitted to the liquid, part of the liquid is formed into a vapor pressure in the space 95 between the liquid 12 and the upper surface 75 of the chamber 70. This vapor pressure pushes downwardly on the liquid 12 which in turn forces the diaphragm member 60 downwardly to overcome the force from the spring means 61 to move the plunger arm 36 and plug member 40 downwardly.

If it is desired to partially close the opening 37 to reduce the flow of fluids through the valve body 29, the temperature controller TC can be set to maintain the heating element 90 at a desired temperature such that the vapor pressure inside the chamber 70 does not increase over a desired amount.

However, if it is desired to completely close the opening 37 the heating element 90 continues raising the temperature inside the chamber 70 until the vapor pressure in the chamber 70 is sufficient to force the diaphragm member 60 downwardly to enable the plug to be completely fitted into the opening 37 which thereby prevents communication between the upstream member 30 and the downstream member 32. The valve system 20 can remain closed as long as desired by maintaining the pressure and temperature in the chamber 70 through the temperature control TC.

When it is desired to decrease the pressure in the system, the electrical signal is transmitted from the electrical conduit 87 to the electro-mechanical device 86 to open the solenoid valve V. When this occurs, the vapor pressure in the portion 95 of the chamber 70 escapes upwardly into the reservoir receiving means 11 or chamber opening 85, which decreases the pressure in the upper portion 51a of the housing opening 51 to thereby enable the spring means 61 to move the diaphragm 60 upwardly. As the diaphragm moves upwardly, the diaphragm carrying member 45 is also moved upwardly which moves the plunger arm 36 and the plunger member 40 upwardly to enable the opening 37 to communicate with the downstream channel 30 and upstream channel 32.

The vapor that escapes into the opening 85 cools and thus condenses into fluid to flow back into the chamber 70 for mixing with the remaining fluid 12 in such chamber. Of course, during such period of time, the heating means 90 has also been turned off to prevent an increase in temperature in the system.

While the power system for valves has been described as being with a diaphragm type valve, it is to be especially understood that such power system can also be used with piston type valves and can be used for control pressure output valves or for controlled flow for automatic valves.

We claim:

1. An improved, closed, power system for the operation of other systems comprising:
   a. chamber means for storing an expandable medium, wherein an increase in pressure on the medium causes an increase in pressure in the closed system;

b. means for communicating said means for storing with said other system, said communicating means conveying variations in pressure of the expandable medium to said other system to enable said other system to respond to variations in pressure of the expandable medium;

c. reservoir receiving chamber means separated from said chamber means for storing;

d. conduit means connected at one end to said chamber means for storing and at the other end to said reservoir receiving chamber means;

e. valve means mounted in said conduit means, said valve means preventing or permitting communication between said chamber means for storing and said reservoir receiving chamber means;

f. said valve means being closed when the pressure is increasing in said chamber means for storing and being open when it is desired to decrease the pressure in said chamber means for storing;

g. electrical means connected with said valve means for opening and closing said valve means as desired and wherein closing and opening of said valve means enables the other system to respond to variations in pressure to regulate flow through such other system; and h. means for transmitting energy to said expandable medium when said medium is in said chamber means for storing wherein said means for transmitting energy and said valve means are actuated by said electrical means such that an increase in pressure on the system occurs when said valve means in closed and a decrease in pressure on the system occurs when said valve means is opened.

2. The structure as set forth in claim 1, wherein the expandable medium is a liquid-gas medium depending on the temperature and pressure of the system and wherein only the gas medium expands into said reservoir receiving chamber means when said valve means is open.

3. The structure as set forth in claim 1, wherein said means for transmitting energy to said expandable medium includes:

a. an electrically temperature control heating means mounted with said chamber means for storing; and b. electrical conduit means connected to said electrically temperature control heating means to energize said heating means to increase the temperature in said chamber means for storing which thereby causes an increase in pressure in said chamber means for storing when said valve means is closed and wherein actuation of said heating means to de-energize said heating means occurs when said valve means is opened by said electrical means.

4. The structure as set forth in claim 3 wherein said electrically temperature control heating means and said valve means are simultaneously energized and de-energized and opened and closed, respectively, simultaneously by said electrical means.

5. The structure as set forth in claim 4, wherein said expandable medium responds to an increase in temperature in said chamber means for storing such that a portion of the expandable medium converts into a gaseous medium thereby causing an increase in vapor pressure in the chamber means for storing which pressure forces downwardly on the liquid medium to thereby cause the other system to respond to such increase in pressure.

6. The structure as set forth in claim 5, wherein deenergizing of the electrically temperature control heating means simultaneously enables said valve means to open which thereby enables the gaseous medium to escape into said reservoir receiving chamber means for cooling of the gaseous medium and to release pressure of the other system thereby regulating such system.

7. The structure as set forth in claim 6, wherein the gaseous medium condenses into liquid form when cooled to return to said chamber means for storing.

8. An improved closed power system for the operation of other systems comprising:

a. chamber means for storing an expandable medium, said expandable medium responding to changes in temperature wherein an increase or decrease in temperature of the expandable medium causes an increase or decrease in pressure in said chamber means;

b. means communicating variations in pressure of the expandable medium in the chamber means to the other system to enable the other system to respond to such variations in pressure of the expandable medium;

c. means for controlling the temperature of the expandable medium mounted with said chamber means wherein the means for controlling the temperature controls the increase or decrease in pressure of the expandable medium in the chamber means;

d. external source means for transmitting energy to said means for controlling the temperature of the expandable medium wherein said external source means actuates said means for controlling the temperature of the expandable medium to thereby accurately control the increase or decrease in pressure in the chamber means enabling operation of the other power system; and e. a reservoir receiving means separate from said chamber means and from said other system and operably connected to said chamber means for receiving said expandable medium at increased pressure from said chamber means in order to decrease the pressure of said expandable medium remaining in said chamber means.

* * * * *